(12) United States Patent
Chepurnaya et al.

(10) Patent No.: US 7,888,229 B2
(45) Date of Patent: Feb. 15, 2011

(54) METHOD FOR MANUFACTURING AN ENERGY STORAGE DEVICE

(75) Inventors: Irina Chepurnaya, St. Petersburg (RU); Alexander Timonov, St. Petersburg (RU); Sergey Logvinov, St. Petersburg (RU); Sam Kogan, Newton Center, MA (US)

(73) Assignee: GEN 3 Partners, Inc., Boston, MA (US)

( * ) Notice: Subject to any disclaimer, the term of this patent is extended or adjusted under 35 U.S.C. 154(b) by 716 days.

(21) Appl. No.: 11/726,985

(22) Filed: Mar. 23, 2007

(65) Prior Publication Data

US 2007/0234537 A1    Oct. 11, 2007

Related U.S. Application Data

(60) Provisional application No. 60/785,626, filed on Mar. 24, 2006.

(51) Int. Cl.
*H01L 21/20* (2006.01)

(52) U.S. Cl. .................. 438/396; 438/99; 438/239; 438/329; 257/E21.351; 257/E21.397; 29/25.03

(58) Field of Classification Search ................ 438/171, 438/190, 329, 768; 257/E21.351, E21.364, 257/E21.397
See application file for complete search history.

(56) References Cited

U.S. PATENT DOCUMENTS

| | | |
|---|---|---|
| 3,962,250 A | 6/1976 | Neri et al. |
| 4,535,039 A | 8/1985 | Naarmann et al. |
| 4,542,010 A | 9/1985 | Roman et al. |
| 4,609,600 A | 9/1986 | Heinze et al. |

(Continued)

FOREIGN PATENT DOCUMENTS

JP    58-111268    7/1983

(Continued)

OTHER PUBLICATIONS

Reddinger, et al., "Tunable Redox and Optical Properties Using Transition Metal-Complexed Polythiophenes," 1997 American Chemical Society, pp. 673-675.

(Continued)

*Primary Examiner*—Charles D Garber
*Assistant Examiner*—Cheung Lee
(74) *Attorney, Agent, or Firm*—K&L Gates LLP

(57) ABSTRACT

The present invention relates to methods of manufacturing an electrochemical energy storage device, such as a hybrid capacitor. The method comprises saturating a porous electrically conductive material in a solution comprising an organic solvent and a metal complex or a mixture of metal complexes; assembling a capacitor comprising the positive electrode made of porous electrically conductive material saturated with a metal complex, a negative electrode, and a separator in a casing; introducing the electrolyte solution into the casing; sealing the casing; and subsequent charge-discharge cycling of the capacitor. The charge-discharge cycling deposits a layer of an energy-accumulating redox polymer on the positive electrode. The electrolyte solution for filling the hybrid capacitor contains an organic solvent, a metal complex, and substances soluble to a concentration of no less than 0.01 mol/L and containing ions that are electrochemically inactive within the range of potentials between −3.0 V to +1.5 V.

19 Claims, 1 Drawing Sheet

U.S. PATENT DOCUMENTS

| | | | |
|---|---|---|---|
| 4,666,567 | A | 5/1987 | Loch |
| 4,695,358 | A | 9/1987 | Mizuno et al. |
| RE33,352 | E | 9/1990 | Roman et al. |
| 4,999,263 | A | 3/1991 | Kabata et al. |
| 5,543,326 | A | 8/1996 | Heller et al. |
| 5,620,812 | A | 4/1997 | Tahara et al. |
| 5,729,427 | A | 3/1998 | Li et al. |
| 5,840,443 | A | 11/1998 | Gregg et al. |
| 6,323,309 | B1 | 11/2001 | Swager et al. |
| 6,413,676 | B1 | 7/2002 | Munshi et al. |
| 6,533,918 | B2 | 3/2003 | Roitman et al. |
| 6,777,134 | B2 | 8/2004 | Moui et al. |
| 6,795,293 | B2 | 9/2004 | Timonov et al. ............ 361/303 |
| 6,802,951 | B2 | 10/2004 | Hossick-Schott |
| 7,292,431 | B2 | 11/2007 | Timonov et al. |
| 2002/0089807 | A1 | 7/2002 | Bluvstein et al. |
| 2004/0057191 | A1 | 3/2004 | Timonov et al. |
| 2005/0217998 | A1 | 10/2005 | Timonov et al. ............ 205/316 |
| 2005/0258042 | A1 | 11/2005 | Lyubomirskiy et al. |
| 2007/0065719 | A1 | 3/2007 | Timonov et al. ............ 361/503 |
| 2009/0026085 | A1 | 1/2009 | Uchi et al. |

FOREIGN PATENT DOCUMENTS

| | | | |
|---|---|---|---|
| JP | 59-196566 | | 11/1984 |
| JP | 59-196571 | | 11/1984 |
| JP | 60-180064 | | 9/1985 |
| JP | 61-193367 | | 8/1986 |
| JP | 04-147511 | | 5/1992 |
| JP | 04-202684 | | 7/1992 |
| JP | 06-243715 | | 9/1994 |
| JP | 08-180878 | | 7/1996 |
| JP | 2002-142369 | | 5/2002 |
| JP | 2003-309044 | * | 10/2003 |
| WO | WO 03065536 A2 | | 8/2003 |

OTHER PUBLICATIONS

Reddinger, et al., "Site Specific Electropolymerization to Form Transition-Metal-Containing, Electroactive Polythiophenes," 1998 American Chemical society, pp. 1236-1243.

Reddinger, et al., "A Novel Polymeric Metallomacrocycle Sensor Capable of Dual-Ion Cocomplexation," American Chemical Society, pp. 3-5, 1998.

Ordaz, et al., "Electrocatalysis of the reduction of organic halide derivatives at modified electrodes coated by cobalt and iron macrocyclic complex-based films; application to the electrochemical determination of pollutants," EDP Sciences, Wiley-VCH, pp. 238-244, 2000.

Liu, et al., "Electro-catalytic oxidation of ascorbic acid at a cobalt-salen polymer modified electrode and analytical applications," Analytical Letter, 33(2), pp. 175-192 (2000).

Mao, et al., "Eletrochemical Nitric Oxide Sensors Based on Electropolymerized Film of M(salen) with Central Ions of Fe, Co, Cu and Mn," Electroanalysis, Dec. 2000, No. 1, pp. 72-77, (2000).

Hoferkamp, et al., "Surface-Modified Electrodes Based on Nickel (II) and Copper (II) Bis(salicyladimine) Complexes," American Chemical Society, pp. 348-352 (1989).

Bedioui, et al., "Electrooxidative polymerization of cobalt, nickel and manganese salen complexes in acetonitrile solution," J. Electroanal. Chem., 301, pp. 267-274 (1991).

Audebert, et al., "Redox and Conducting Polymers Based on Salen-Type Metal Units; Electrochemical Study and Some Characteristics," New Journal of Chemistry, vol. 16, pp. 697-703 (1992).

Timonov, et al. "Synthesis and Properties of New Polymeric Partially Oxidized Complexes of Platinum and Palladium with Schiff Bases," Workshop on Platinum Chemistry: Fundamental and Applied Aspects, p. 28, Departimento di Chimica, Ferrara, Italy (1991).

Shagisultanova, et al., "Synthesis and Properties of Polymeric Partially Oxidized Complexes of Nickel, Palladium, and Platinum with Tetradentate Schiff Bases," Plenum Publishing Corp., pp. 286-293 (1991).

Lewis, "A Simple General Model for Charge Transfers in Polymers, Faraday Discussions of the Chemical Society," V. 88, pp. 189-201 (1989).

Mao, et al., "A New Ultramicrosensor for Nitric Oxide Based on Electropolymerized Film of Nickel Salen," Analytical Letters, 31(12), pp. 1991-2007 (1998).

Audebert, et al. "Electrochemical Polymenzation of Several Salen-Type complexes Kinetic Studies in the Microsecond the Range," J. Electroanal. Chem. 338, pp. 269-278 (1992).

Horwitz, et al., "Oxidative Electropolymerization of Metal Schiff-Base Complexes," Mol. Cryst. Liq. Cryst., V. 160, pp. 389-404 (1988).

Martins, et al., "Ni(Salen)-Based Polymer Modified Electrodes as Sensors for Metal Ions," Electrochemical Society Proceedings, vol. 2001-18, pp. 399-407 (2001).

International Search Report for International Application No. PCT/US2007/007390, mailed from the International Searching Authority on Jan. 3, 2008.

Written Opinion of the International Searching Authority for International Application No. PCT/US2007/007390, mailed from the International Searching Authority on Jan. 3, 2008.

H.C. Hurrell, et al., Redox Conduction in Electropolymerized Films of Transition-Metal Complexes of Os, Ru, Fe and Co, 1990, vol. 29, pp. 736-741, Inorg. Chem.

B.E.Conway, Electrochemical Supercapacitor, 1999, pp. 299-304, Kluwer Acad. Plen. Publ. New York.

Lewis, T.J., A Simple General Model for Charge Transfer in Polymers, 1989, vol. 88, pp. 189-201, Faraday Discuss. Chem. Soc.

Cassidy, H. G., et al., Oxidation-Reduction Polymers, Chapter 1: Overall View of the Field of Oxidation-Reduction Polymers, 1965, pp. 1-11, Wiley Interscience, New York.

* cited by examiner

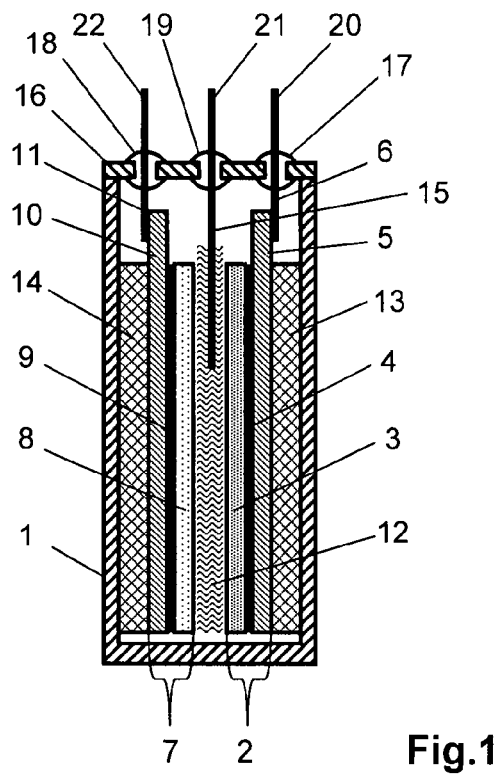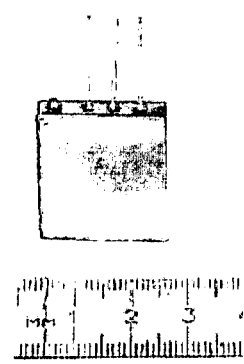
Fig.1
Fig.2
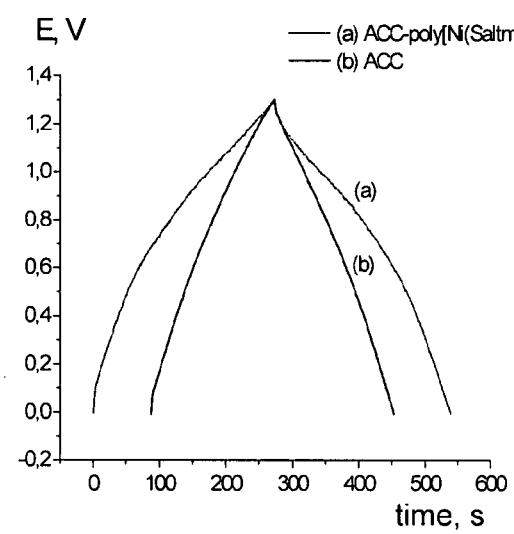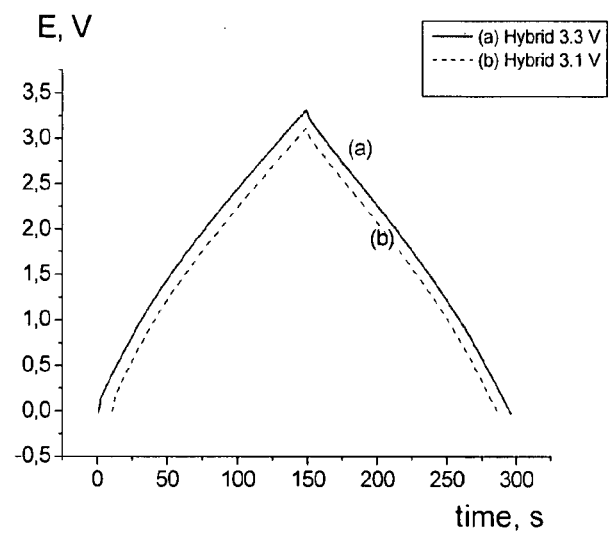
Fig.3
Fig.4

METHOD FOR MANUFACTURING AN ENERGY STORAGE DEVICE

RELATED APPLICATIONS

This application claims priority to U.S. Provisional Patent Application 60/785,626 filed on Mar. 24, 2006, the disclosure of which is herein incorporated by reference in its entirety.

FIELD OF THE INVENTION

The invention claimed herein relates generally to electrochemistry, more particularly, to methods of manufacturing electrochemical energy storage devices, even more particularly, to methods of manufacturing hybrid capacitors equipped with a positive electrode modified by a redox polymer.

BACKGROUND OF THE INVENTION

An electrochemical capacitor, also known as a supercapacitor or an ultracapacitor, is an energy storage device that combines the high energy storage potential of a battery with the high energy transfer rate of a conventional capacitor. The performance characteristics of an electrochemical capacitor can be evaluated in terms of its specific energy, the amount of energy that can be stored per unit weight, and in terms of its specific power, the rate at which an amount of energy can be transferred in or out of that unit weight.

An electrochemical capacitor usually includes a hermetically sealed casing filled with electrolyte, a positive electrode and a negative electrode placed in the casing, a separator that separates the positive electrode space from the negative electrode space, and special lead terminals connecting the supercapacitor to external electric circuits.

One type of an electrochemical capacitor is an Electric Double Layer Capacitor (EDLC) that accumulates energy through the charging of an electric double layer at the electrode/electrolyte interface. One of the promising methods for improving the performance of EDLCs is the chemical modification of the positive electrode, for example, through immobilization of energy-accumulating polymers on its surface. Such electrochemical capacitors are called hybrid capacitors. As compared to an EDLC, a hybrid capacitor is characterized by a significantly higher specific energy and an increased operational voltage.

As mentioned above, immobilization of conductive polymers on the surface of the positive electrode of a supercapacitor can improve its performance. Conductive polymers are sub classified into two types [B. E. Conway, *Electrochemical Supercapacitors*, Kluwer Acad. Plen. Publ., NY, 1999, 698 p.]: (1) so called "organic metals" or conducting polymers—these are polymers with a conduction mechanism similar to that of metals and (2) redox polymers—i.e., compounds, in which electrons are transferred due to redox reactions between adjacent fragments of a polymer chain.

Examples of "organic metals" are poly(acetylene), poly(pyrrole), poly(thiophene), and poly(aniline). In partly oxidized form, these polymers are characterized by a very high conductivity and can be considered as salts consisting of positively charged "ions" of the polymer and charge-compensating counterions of the supporting electrolyte, which are uniformly distributed throughout the polymer structure and maintain the overall electric neutrality of the system. In solid state physics, the cation-radical, which is partly delocalized throughout the polymer fragment, is called a polaron. The polaron theory of conductivity is acknowledged to be the main model of charge transfer in conducting polymers. [*Charge Transfer in Polymeric Systems*, Faraday Discussions of the Chemical Society. 1989. V.88].

"Organic metals" may be obtained using a method of electrochemical oxidation of appropriate monomers on the surface of an inert electrode. These polymers may be converted from the conducting (oxidized) state to non-conductive (neutral) state through the variation of the electrode potential. The transformation of the polymer from an oxidized state into a neutral state is accompanied by the release of charge-compensating counterions from the polymer to electrolyte solution, in which the process develops, and vice versa.

Both purely organic systems and polymer metal complexes refer to redox polymers [H. G. Cassidy and K. A. Kun. *Oxidation Reduction Polymers (Redox Polymers)*, Wiley-Interscience, New York, 1965].

Polymer metal complexes may be obtained through electrochemical polymerization of initial metal complexes. Examples of redox polymers are polypiridine complexes poly-[M(v-bpy)x(L)y], where:
M=Co, Fe, Ru, Os;
v-bpy=4-vinyl-4'-methyl-2,2'-bipyridine;
L=v-bpy (4-vinyl-4'-methyl-2,2'-bipyridine), phenanthroline-5,6-dione, 4-methyl-phenanthroline, 5-aminophenanthroline, 5-chlorophenanthroline;
x+y=3 [Hurrel H. C., Abruna H. D. *Redox Conduction in Electropolymerized Films of Transition Metal Complexes of Os, Ru, Fe, and Co*, Inorganic Chemistry. 1990. V.29. P.736-741].

Redox centers, i.e. atoms participating in redox reactions, in the polymer are metal ions that should have different oxidation states. Thus, complexes of metals, which have only one possible oxidation state (for example, zinc, cadmium) will not form redox polymers. In order for a redox polymers to be conductive, a highly developed system of conjugated π-bonds in a ligand environment must be present, with these π-bonds functioning as conductive "bridges" between the redox centers. When a redox polymer is completely oxidized or completely reduced (i.e. all its redox centers are in one identical oxidation state), the charge transfer along the polymer chain is impossible and the conductivity of a redox polymer is close to zero.

When redox centers have different oxidation states, electron exchange between redox centers is possible. In this case, the electric conductivity of redox polymers is proportional to the rate constant of the electron self-exchange reaction between redox centers ($k_{se}$) and concentrations of oxidized ([Ox]) and reduced ([Red]) centers and in a polymer, i.e. conductivity of redox polymer $\sim k_{se}$[Ox][Red].

As compared to electrodes modified by "organic metals" (conducting polymers), redox polymers and electrodes with redox polymers on their surface (i.e. electrodes modified by redox polymers) potentially offer higher specific energy owing to the greater contribution of the Faraday component of capacity to the overall capacity of the polymer, which is associated with multi-electron oxidation/reduction of metal centers.

The traditional method of manufacturing hybrid capacitors equipped with positive electrodes modified by redox polymers includes the following stages.

Manufacturing of electrodes. Electrodes may consist of a porous electrically conductive material (e.g. substrate) and current collectors with high electronic conductivity.

Deposition of the polymer on the positive electrode. The polymer may be deposited on the positive electrode via electrochemical polymerization of metal complexes on the surface of a porous electrically conductive electrode substrate of the positive electrode in an electrolysis bath. The negative electrode in the electrolysis bath may be an electrochemically inert material, for example, carbon cloth, that performs the function of an auxiliary electrode. The electrolysis bath is filled with an electrolyte, which may be a solution consisting of organic solvent, a metal complex, and a substance soluble in this solvent to a concentration of no less than 0.01 mol/L and containing ions that are electrochemically inactive within the range of potentials between −3.0 V to +1.5 V (from here on the values of potentials are given versus a standard silver/silver chloride reference electrode). To perform polymerization using an external electric power source, constant voltage or pulses of voltage are supplied to the electrodes in the electrolysis bath. The duration of polymerization process may range from 10 hours to 24 hours;

Assembly of a capacitor. The assembly of the hybrid capacitor includes the placement of the positive electrode modified by the polymer, the negative electrode, and a separator, which separates the electrodes, in a casing. The hybrid capacitor is then filled with an electrolyte solution consisting of an organic solvent and a substance soluble in this solvent to a concentration of no less than 0.01 mol/L and containing ions that are electrochemically inactive within the range of potentials between −3.0 V to +1.5 V. After the hybrid capacitor is filled with the electrolyte, the casing of the hybrid capacitor is hermetically sealed.

Conditioning of a capacitor. Conditioning the capacitor implies charging and discharging of the capacitor several times. The repeated charging and discharging removes any impurities from the electrolyte and either of the electrodes due to electrochemical oxidation and reduction of the impurities. The duration of capacitor conditioning may be no less than about 50 hours.

The main disadvantage of the traditional method for manufacturing of electrochemical capacitors equipped with positive electrodes modified by redox polymers is the presence of a special stage for the deposition of the polymer onto the porous substrate of the positive electrode prior to the assembly of the capacitor. This stage requires both additional equipment for polymerization and significant time for the process to occur. Additionally, during the assembly of the capacitor, in particular, during the arrangement of electrodes in the casing, the polymer layer may be damaged, which may result in the degrading of electrochemical properties of the product as a whole.

Therefore, a need exists to create a redox polymer modified positive electrode without the use of special equipment and without the risk of damaging the redox polymer immobilized on the surface of the positive electrode.

SUMMARY OF THE INVENTION

In satisfaction of these needs and others, the present invention relates to a method of manufacturing an electrochemical energy storage device, such as a hybrid capacitor. In one embodiment, the method includes three steps. The first step is the saturation of a porous electrically conductive material by soaking it in a solution containing an organic solvent and a metal complex able to form a stacked redox polymer, or a mixture of said metal complexes. The concentration of a the complex in a said solution may be no less than 0.0001 mol/L. The porous electrically conductive material may be soaked in a said solution until the porous electrically conductive material saturated with a said metal complex or a mixture of metal complexes is obtained.

The second step is the assembly of a capacitor, which implies the placement of the positive electrode, a negative electrode, and a separator that separates the positive electrode and the negative electrode in a casing, the introduction an electrolyte solution into the casing, and hermetic sealing of the casing. The third step is execution of no less than one cycle of charging-discharging of the capacitor.

In one embodiment, the electrolyte solution contains an organic solvent, a metal complex able to form a stacked redox polymer or a mixture of said metal complexes, and a substance soluble in a given solvent to a concentration of no less than 0.01 mol/L and containing ions that are electrochemically inactive within the range of potentials between −3.0 V to +1.5 V.

In some embodiments, the porous electrically conductive material is an electronically conductive material with a high specific surface area, which is electrochemically inactive at potentials between −3.0 V and +1.5 V. The porous electrically conductive material may be a carbon material with a high specific surface area, a carbon material coated with metal, a metal with a high specific surface area, or an electronically conductive polymer in the form of a film, porous structure, or solid foam.

In one embodiment the organic solvent is selected from the group consisting of acetonitrile, ethanol, alkyl carbonate solvents, and combinations thereof.

In some embodiments, the metal complex is a transition metal complex with a substituted tetradentate Schiff base, the transition metal having at least two different oxidation states, the metal complex having a planar structure with the deviation from the plane of no more than 0.1 nm, and a branched system of conjugated π-bonds.

In some embodiments, the metal complex is a metal complex [M(R−Salen)], wherein:

M is a transition metal having at least two different oxidation states,

R a substituent in a Schiff base,

Salen is a residue of bis(salicylaldehyde)ethylenediamine in a Schiff base.

In some embodiments the metal complex is a metal complex [M(R-Saltmen)], wherein:

M is a transition metal having at least two different oxidation states,

R is a substituent in a Schiff base,

Saltmen is a residue of bis(salicylaldehyde)tetramethylethylenediamine in a Schiff base.

The transition metal M in the metal complex may be Ni, Pd, Co, Cu, or Fe. The substituent R in the metal complex may be H— and electron-donating substituents $CH_3O$—, $C_2H_5O$—, HO—, —$CH_3$.

In one embodiment, the solution, in which the porous electrically conductive material is soaked, may additionally contain substances soluble in the solution to a concentration of no less than 0.01 mol/L and containing ions that are electrochemically inactive within the range of potentials between −3.0 V to +1.5 V. The soluble substances in the solution, in which the porous electrically conductive material is soaked, and in the electrolyte solution may be salts of tetramethylammonium, tetraethylammonium, or tetrabutylammonium-tetrafluoroborates, perchlorates, hexafluorophosphates.

In some embodiments, the current density for charging and discharging of the capacitor is between 0.1 $mA/cm^2$ and 500 $mA/cm^2$.

In one embodiment, the temperature of the solution, in which the porous electrically conductive material is soaked, is maintained between 20° C. and 50° C.

BRIEF DESCRIPTION OF THE DRAWINGS

These embodiments and other aspects of this invention will be readily apparent from the detailed description below and the appended drawings, which are meant to illustrate and not to limit the invention, and in which:

FIG. 1 is a schematic of a hybrid capacitor made according to embodiments of the present invention.

FIG. 2 is a depiction of a hybrid capacitor made according to embodiments of the present invention.

FIG. 3 is a graph depicting the charge-discharge curve of a hybrid capacitor's positive electrode upon the completion of polymerization process, according to the present invention (curve (a)) and a charge-discharge curve of a positive electrode of an electric double layer capacitor, without a polymer layer (curve (b)).

FIG. 4 is a graph depicting the charge-discharge curves of a hybrid capacitor made according to the present invention.

DETAILED DESCRIPTION OF THE INVENTION

Aspects of the invention will be more completely understood through the following detailed description, which should be read in conjunction with the attached drawings. In this description, like numbers refer to similar elements within various embodiments of the present invention. Within this detailed description, the claimed invention will be explained with respect to preferred embodiments. However, the skilled artisan will readily appreciate that the methods and systems described herein are merely exemplary and that variations can be made without departing from the spirit and scope of the invention.

The present invention relates to the development of an improved method for manufacturing a hybrid capacitor by reducing the time required to modify a positive electrode by a polymer, to avoid the use of additional equipment for that polymerization, and to ensure the preservation of the polymer properties during the process of hybrid capacitor manufacturing.

The present method includes providing two electrodes, a positive electrode and a negative electrode, saturating the positive electrode with a metal complex to form a metal complex saturated electrode. The negative electrode and the positive electrode may then be assembled on an opposite side of a separator in a casing. The casing is then filled with an electrolyte solution comprising the metal complex and sealed. A layer of energy accumulating redox polymer is then formed on a substrate of said saturated electrode as the hybrid capacitor is conditioned.

The method for manufacturing a hybrid capacitor according to the present invention includes the following stages.

Manufacturing of electrodes. According to the present invention, an electrode consists of a substrate and a current collector connected to it. The substrate, in one embodiment, is an electrically conductive material with a high specific surface area. The substrate, in one embodiment, is electrochemically inactive within the range of potentials from −3.0 V to +1.5 V. The substrate in various embodiments is made of, for example, carbon fiber material and other carbon materials, carbon materials with metal coating, metals with a high specific surface area, electronically conducting polymers in the form of a film, porous structures, and solid foams.

The electrode to be used as a positive electrode in a hybrid capacitor is then saturated with a metal complex. In order to do this, the electrode is soaked in a bath, which contains a solution of the metal complex. The metal complex is a complex compound of transition metals (for example, Ni, Pd, Co, Cu, Fe) or a mixture of different complex compounds. The metal complex should have at least two different oxidation states of the metal centers, a planar structure with deviations from the plane no more than 0.1 nm, and a highly developed system of conjugated π-bonds in order to form a stacked redox polymer on the positive electrode surface during the electro-polymerization. In some embodiments, the metal complexes are metal complexes with substituted tetradentate Schiff bases, including poly-[M(R-Salen)] and poly-[M(R-Saltmen)], where: M is a transition metal (for example, Ni, Pd, Co, Cu, Fe), Salen is a residue of bis(salicylaldehyde)ethylenediamine in a Schiff base, Saltmen is a residue of bis(salicylaldehyde)tetramethylethylenediamine in a Schiff base, R is a substitute, for example, radicals H—, $CH_3O$—, $C_2H_5O$—, HO—, —$CH_3$, etc. [See U.S. Pat. No. 6,795,293].

The metal complex solution is prepared based on organic solvents, for example, acetonitrile, ethanol, alkyl carbonate solvents, such as propylene carbonate, ethylene carbonate, and other various alkyl carbonate solvents. In some embodiments, different mixtures of various alkyl carbonate solvents are used. The metal complex concentration in the solution may vary from $10^{-4}$ mol/L to the concentration of a saturated solution. The temperature of the solution may vary from 20° C. to 50° C.

Upon soaking the electrode in a solution of a metal complex, the molecules of the metal complex penetrate into the porous structure of a substrate, are adsorbed on the surface of the substrate, and create fairly strong bonds with the substrate of the positive electrode. Depending upon the required concentration of a metal complex in the positive electrode, the duration of soaking the electrode in a solution of a metal complex may vary from about 10 minutes to about 10 hours.

In order to manufacture positive electrodes, the substrate in the form of a film or a sheet may be first saturated with a metal complex and then cut into individual pieces of substrate for positive electrodes.

Assembly of a capacitor. At this stage, the positive electrode (i.e. the electrode containing the metal complex), the negative electrode, and the separator, which separates the positive electrode and the negative electrode, are arranged in the casing of the hybrid capacitor. The separator may be any type of material traditionally used as a separator in electrochemical capacitors, for example, porous paper. The casing may be any type of a casing traditionally used as a casing of an electrochemical capacitor, for example, a steel casing. The casing is then filled with an electrolyte solution consisting of an organic solvent, a metal complex, and a substance soluble in this solvent to a concentration of no less than 0.01 mol/L and containing ions that are electrochemically inactive within the range of potentials between −3.0 V to +1.5 V. The soluble substances, in one embodiment, are salts of tetramethylammonium, tetraethylammonium or tetrabutylammonium, for example, perchlorates, tetrafluoroborates, hexafluorophosphates. The soluble substances may be other substances meeting the above requirements. The concentration of the said soluble substances in electrolyte may vary within the range of from $10^{-2}$ mol/L to a concentration restricted by the limit of solubility.

The metal complex or a mixture of metal complexes used to saturate the substrate of the positive electrode, or a similar metal complex or a mixture of similar metal complexes meeting the above requirements for production of stacked energy-accumulating redox polymers, are used as the metal complex in the electrolyte. The concentration of the metal complex in electrolyte may be within the range from $10^{-4}$ mol/L to a concentration restricted by the limit of solubility.

The organic solvent may be acetonitrile or alkyl carbonate solvents (propylene carbonate, ethylene carbonate) or mixtures of various alkyl carbonate solvents.

After the hybrid capacitor is filled with an electrolyte solution, the casing of the hybrid capacitor is hermetically sealed.

Combined polymerization of a metal complex on the positive electrode and conditioning of the hybrid capacitor. A fixed number of charging-discharging cycles is performed to polymerize the metal complex on the positive electrode and also to condition the hybrid capacitor. During the process of a hybrid capacitor charging, a layer of an energy-accumulating redox polymer is formed in the pores of the positive electrode substrate concurrently with the electrochemical oxidation and reduction of impurities contained in electrolyte and both the positive electrode and the negative electrode.

The charging-discharging of the hybrid capacitor occurs under the conditions of supplying a direct current from the external power source. The current density for charging-discharging the hybrid capacitor may be within the range from 0.1 mA/cm$^2$ to 500 mA/cm$^2$. The density of discharge current may be equal to charging current density or may exceed the charging current density by 2 to 10 times. No less than one cycle of charging-discharging of the hybrid capacitor should be performed in order to form a layer of energy-accumulating redox polymer in pores of the positive electrode substrate. Charging-discharging of the capacitor may continue after polymer formation and typically takes less than about 50 hours.

As a result of implementation of the present method for manufacturing a hybrid capacitor, a layer of energy-accumulating polymer created by the polymerization of the metal complex, is formed on the surface of the positive electrode. A separate stage of a redox polymer formation is eliminated from the sequence of steps for manufacturing a hybrid capacitor. Instead, polymer formation is combined with the process of capacitor conditioning. This enables a reduction in the overall duration of the process for manufacturing an energy storage device. Additionally, the described method does not require additional, special equipment for polymerization. The formation of an energy-accumulating redox polymer takes place in situ, i.e., in a hermetically sealed casing of the hybrid capacitor, which reduces the damage to the polymer, a characteristic problem of traditional assembly methods of the product.

The combination of the processes of electrochemical polymerization on a positive electrode and conditioning of the hybrid capacitor may be assisted by the introduction of the metal complex into the electrolyte solution. If the hybrid capacitor is filled with the solution of electrolyte that does not contain any metal complexes, then the metal complexes adsorbed in the pores of a positive electrode substrate partially dissolve into the electrolyte solution. This partial dissolution is caused by the creation of a gradient of metal complex concentration in the positive electrode and in the electrolyte solution. The diffusion of the metal complex from the positive electrode to the electrolyte solution leads to a reduction in the polymerization process. The introduction of metal complexes into the electrolyte solution decreases the gradient of metal complex concentration in the substrate and in the electrolyte and decreases the diffusion of the adsorbed metal complex from the positive electrode into the solution. The decrease in the rate of diffusion is related to the increase of the metal complex concentration in the electrolyte.

Apart from indicated peculiarities of implementation of this method, the introduction of a metal complex into the hybrid capacitor electrolyte provides for forming a certain additional amount of energy-accumulating polymer in the porous substrate of a positive electrode, and the amount of the polymer could be controlled by altering the metal complex concentration in electrolyte solution within the limits, which are indicated above.

During the implementation of the method herein claimed, at the stage of the saturation of a positive electrode blank with a metal complex, the concentration of the metal complex in the solution, as it was indicated above, may vary from $10^{-4}$ mol/L to the concentration of a saturated solution. With an increase in the solution concentration, the duration of penetration process, which is necessary for the obtainment of required concentration of the metal complex molecules in the substrate pores, is reduced.

The introduction of metal complexes into the hybrid capacitor electrolyte may also provide for the formation additional energy-accumulating polymer in the porous substrate of a positive electrode. This additional amount of polymer deposition may be controlled by altering the metal complex concentration in the electrolyte solution within the prescribed limit, i.e., between about $10^{-4}$ mol/L and the concentration of saturated electrolyte solution. With an increase in the electrolyte solution concentration, the duration of the penetration process, i.e. the time required to obtain the optimal concentration of the metal complex molecules in the substrate pores, is reduced.

A decrease in the solvent viscosity may also lead to an increase in the rate of diffusion of metal complexes and to a reduction in the time required to polymerize the positive electrode. Increasing the temperature of the electrolyte may also contribute to a decrease of the solvent viscosity and to the reduction the duration of the penetration process. The temperature of the solution may be increased to the solvent's boiling point. Additionally, stirring the solution in the bath or pumping the electrolyte solution through a porous substrate may also reduce the duration of the positive electrode saturation with the metal complex.

In addition, a solution used for saturating the positive electrode may also contain a substance soluble in a given solvent to a concentration of no less than 0.01 mol/L and containing ions that are electrochemically inactive within the range of potentials between $-3.0$ V to $+1.5$ V. Examples of these substances may include salts of tetramethylammonium, tetraethylammonium, or tetrabutylammonium—such as tetrafluoroborates, perchlorates, hexafluorophosphates, and other substances meeting the above requirements. The presence of such substances in a solution for saturation allows for reducing the duration of electrochemical polymerization and increasing the energy storage capacity of a hybrid capacitor.

An example of implementation of the claimed method of making a hybrid capacitor is described below and depicted in FIG. 1.

During the first step of the process, pieces of carbon cloth KYNOL® ACC 710-25 (1.5×2.0 cm in size), manufactured by American Kynol, Inc, of Pleasantville, N.Y., were used as a porous substrate for both positive and negative electrodes. A conducting aluminum layer was applied by the vacuum deposition method onto one side of the carbon cloth to create electrical contact with the current collector. Pieces of aluminum foil were connected to the aluminum layer deposited onto the carbon cloth by spot welding and served as current collectors. Steel wires were welded to the aluminum foil and served as capacitor terminals.

A positive electrode was placed in a solution of the metal complex bis(salicylaldehyde)tetramethylethylenediaminatonickel (II) ([Ni(Saltmen)]) in acetonitrile (concentration of the metal complex solution −0.013 mol/L). The blank was kept in this solution for a period of 30 minutes at room temperature.

During the next step, referring to FIG. 1, the hybrid capacitor of the present invention was assembled as follows. The hybrid capacitor of the present invention may include a positive electrode 2 having a porous substrate 3 saturated with a metal complex, a conducting layer 4 applied onto one side of the substrate 3, a current collector 5 made as aluminum foil welded to the conducting layer 4, plus a wire 6 welded to a current lead 5, and a negative electrode 7 having a porous substrate 8 (non-saturated with a metal complex), a conducting layer 9 applied onto one side of the substrate 8, a current collector 10 made as aluminum foil welded to the conducting layer 9, and a wire 11 welded to the current collector 10. The positive electrode 2 and the negative electrode 7, including all of their component parts, were installed in a steel casing 1. A porous paper separator 12, that is 80 μm thick, was placed between the positive electrode 2 and the negative electrode 7. A first gasket 13 and a second gasket 14 made of Teflon®, manufactured by E.I. du Pont de Nemours and Company, Wilmington, Del., were placed between the sidewalls of the casing 1 and the positive electrode 2 and the negative electrode 7. The first gasket 13 and the second gasket 14 are intended to facilitate the close packing of electrode-separator assembly, i.e. the positive electrode 2 and the negative electrode 7 plus the separator 12, in the casing 1.

A thin silver wire 15 was wrapped by the separator 12 and was placed between the positive electrode 2 and the negative electrode 7 in order to record the potentials of the positive electrode 2 and the negative electrode 7. This silver wire served as a reference electrode.

The casing 1 has a cover 16 including glass insulators 17, 18 and 19, through which wires 6, 11 and 15 were passed to form terminals 20, 21 and 22 respectively on the outside of the hybrid capacitor. The cover 16 also has an opening (not shown in FIG. 1), through which the casing can be filled with an electrolyte solution.

After the hybrid capacitor components were assembled in the casing 1, the cover 16 was welded to the casing 1. The assembled hybrid capacitor with an unsealed opening was then dried in an inert atmosphere at a temperature of 50° C. for a period of 5 hours.

The hybrid capacitor was filled with an electrolyte solution consisting of acetonitrile, tetraethylammonium tetrafluoroborate (concentration 1 mol/L) and a metal complex [Ni (Saltmen)] (concentration 0.013 mol/L) through the opening in the hybrid capacitor cover.

The opening in the hybrid capacitor cover was welded closed, which resulted in hermetical sealing of the hybrid capacitor.

During the final step, the positive electrode 2 was connected to the positive pole of an external power source via a terminal 20, while the negative electrode 7 was connected to the negative pole of an external power source via a terminal 22. The voltage between the positive electrode 2 and the negative electrode 7 of the hybrid capacitor was measured by means of a voltmeter with a high internal resistance. To measure the potentials of the positive electrode 2 and the negative electrode 7, the voltmeter was connected between the terminals 20 or 22 and a reference terminal 21.

Then, the hybrid capacitor was subjected to a number of charge-discharge cycles under following conditions for the purpose of forming the polymer in the structure of a porous substrate 3 of the positive electrode 2: (1) a charging current of 4 mA (0.67 mA/cm$^2$); (2) a discharge current of 15 mA (2.5 mA/cm$^2$); (3) the upper value of voltage between the positive electrode 2 and the negative electrode 7 in the course of the first charge-discharge cycle was equal to 2.5 V and was increased in each subsequent cycle in a stepwise increment of 0.05 V up to the voltage equal to 3.1 V; (4) the final value of voltage between the positive electrode 2 and the negative electrode 7 during the hybrid capacitor discharge was 0 V. The current was applied to the hybrid capacitor for 3.5 hours (13 charge-discharge cycles). The assembled hybrid capacitor is shown in FIG. 2.

In FIG. 3, the first curve (a) corresponds to the charge-discharge curve of a positive electrode 2 of the hybrid capacitor upon the completion of the process of forming the polymer layer on the positive electrode. The second curve (b) corresponds to the charge-discharge curve of a positive electrode of a conventional double layer capacitor, without a polymer layer on the positive electrode. Charging and discharging currents are 5 mA/cm$^2$. As shown in FIG. 3, the presence of the energy-accumulating redox polymer on the positive electrode of the hybrid capacitor made according to the method of the present invention produces a significant increase in the energy accumulated by the positive electrode.

FIG. 4 shows charge-discharge curves of a hybrid capacitor made according to the method of the present invention for two different operating voltages. The first curve (a) represents voltages between 0 V to 3.3 V. The second curve (b) represents voltages between 0 V and 3.1 V. Charging and discharging currents are 8 mA/cm$^2$. The charge-discharge curves show the operational capability of the hybrid capacitor manufactured according to the present invention. The energy released by such a hybrid capacitor in the course of a discharge within the range of voltages from 3.1 V to 0 V is equal to 5.5 J (curve (b)), and in the course of a discharge within the range of voltages from 3.3 V to 0 V is equal to 6.3 J (curve (a)).

Thus, an operable electrochemical energy storage device—namely, a hybrid capacitor, was produced as a result of implementation of the method of the present invention. The given example shows that a layer of energy-accumulating polymer may be formed on the positive electrode surface without using a special separate polymer-forming stage in the sequence of steps for the manufacturing of a hybrid capacitor. Instead, according to the present invention, the stage of deposition of the polymer layer may be combined with the stage of capacitor conditioning. This combination reduces the complexity and overall duration of the process of a hybrid capacitor manufacturing.

Variations, modification, and other implementations of what is described herein will occur to those of ordinary skill in the art without departing from the spirit and scope of the invention as claimed. Accordingly, the invention is to be defined not by the preceding illustrative description but instead by the spirit and scope of the following claims.

The invention claimed is:

1. A method of manufacturing a hybrid capacitor comprising:
   (a) saturation of a porous electrically conductive material by soaking it in a solution containing:
      an organic solvent; and
      a metal complex able to form a stacked redox polymer, or a mixture of said metal complexes, at a concentration no less than 0.0001 mol/L;
      until the porous electrically conductive material is saturated with said metal complex or mixture of metal complexes;
   (b) assembly of a capacitor which comprises placing a positive electrode made of said porous electrically conductive material saturated with said metal complex or mixture of metal complexes obtained in step (a), a negative electrode, and a separator that separates the positive electrode and the negative electrode in a casing; introducing an electrolyte solution into the casing; and hermetic sealing of the casing, said electrolyte solution containing:
- an organic solvent;
- a metal complex able to form stacked redox polymers or a mixture of said metal complexes;
- and a substance soluble in said organic solvent to a concentration of no less than 0.01 mol/L and containing ions that are electrochemically inactive within the range of potentials between −3.0 V to +1.5 V; and
- (c) execution of no less than one cycle of charging-discharging of the capacitor.

2. The method of claim 1, wherein the porous electrically conductive material is an electronically conductive material with a high specific surface area, which is electrochemically inactive at potentials between −3.0 V and +1.5 V.

3. The method of claim 2, wherein the porous electrically conductive material is a carbon material with a high specific surface area.

4. The method of claim 2, wherein the porous electrically conductive material is a carbon material coated with metal.

5. The method of claim 2, wherein the porous electrically conductive material is a metal with a high specific surface area.

6. The method of claim 2, wherein the porous electrically conductive material is an electronically conductive polymer in the form of a film, porous structure, or solid foam.

7. The method of claim 1, wherein the organic solvent in the electrolyte solution is selected from the group consisting of acetonitrile, ethanol, an alkyl carbonate solvent, and combinations thereof.

8. The method of claim 1, wherein the metal complex in the electrolyte solution and the metal complex in the solution in which the porous electrically conductive material is soaked are selected from a transition metal complex with a substituted tetradentate Schiff base, said transition metal having at least two different oxidation states, said transition metal complex having a planar structure with the deviation from the plane of no more than 0.1 nm and a branched system of conjugated π-bonds.

9. The method of claim 8, wherein the transition metal complex is a metal complex [M(R−Salen)], wherein:
- M is a transition metal having at least two different oxidation states,
- R is a substituent in a Schiff base, and
- Salen is a residue of bis(salicylaldehyde)ethylenediamine in a Schiff base.

10. The method of claim 9, wherein the transition metal M in the metal complex [M(R−Salen)] is selected from the group consisting of Ni, Pd, Co, Cu, and Fe.

11. The method of claim 9, wherein the substituent R in the metal complex [M(R−Salen)] is selected from the group consisting of H, $CH_3O$—, $C_2H_5O$—, HO—, and —$CH_3$.

12. The method of claim 8, wherein the transition metal complex is a metal complex [M(R−Saltmen)], wherein:
- M is a transition metal having at least two different oxidation states,
- R is a substituent in a Schiff base, and
- Saltmen is a residue of bis(salicylaldehyde)tetramethylethylenediamine in a Schiff base.

13. The method of claim 12, wherein the transition metal M in the metal complex [M(R−Saltmen)] is selected from the group consisting of Ni, Pd, Co, Cu, and Fe.

14. The method of claim 12, wherein the substituent R in the metal complex [M(R−Saltmen)] is selected from the group consisting of H, substituents $CH_3O$—, $C_2H_5O$—, HO—, and —$CH_3$.

15. The method of claim 1, wherein the temperature of the solution, in which the porous electrically conductive material is soaked, is maintained between 20° C. and 50° C.

16. The method of claim 1, wherein the solution, in which the porous electrically conductive material is soaked, additionally comprises substances soluble in said solution to a concentration of no less than 0.01 mol/L and containing ions that are electrochemically inactive within the range of potentials between −3.0 V to +1.5 V.

17. The method of claim 16, wherein the soluble substances in the solution, in which the porous electrically conductive material is soaked, are salts of tetramethylammonium, tetraethylammonium, or tetrabutylammonium, each having an anion selected from tetrafluoroborate, perchlorate, and hexafluorophosphate.

18. The method of claim 1, wherein the soluble substances in the electrolyte solution are salts of tetramethylammonium, tetraethylammonium, or tetrabutylammonium, each having an anion selected from tetrafluoroborate, perchlorate, and hexafluorophosphate.

19. The method of claim 1, wherein the current density for charging and discharging of the capacitor is between 0.1 $mA/cm^2$ and 500 $mA/cm^2$.

* * * * *